May 15, 1962

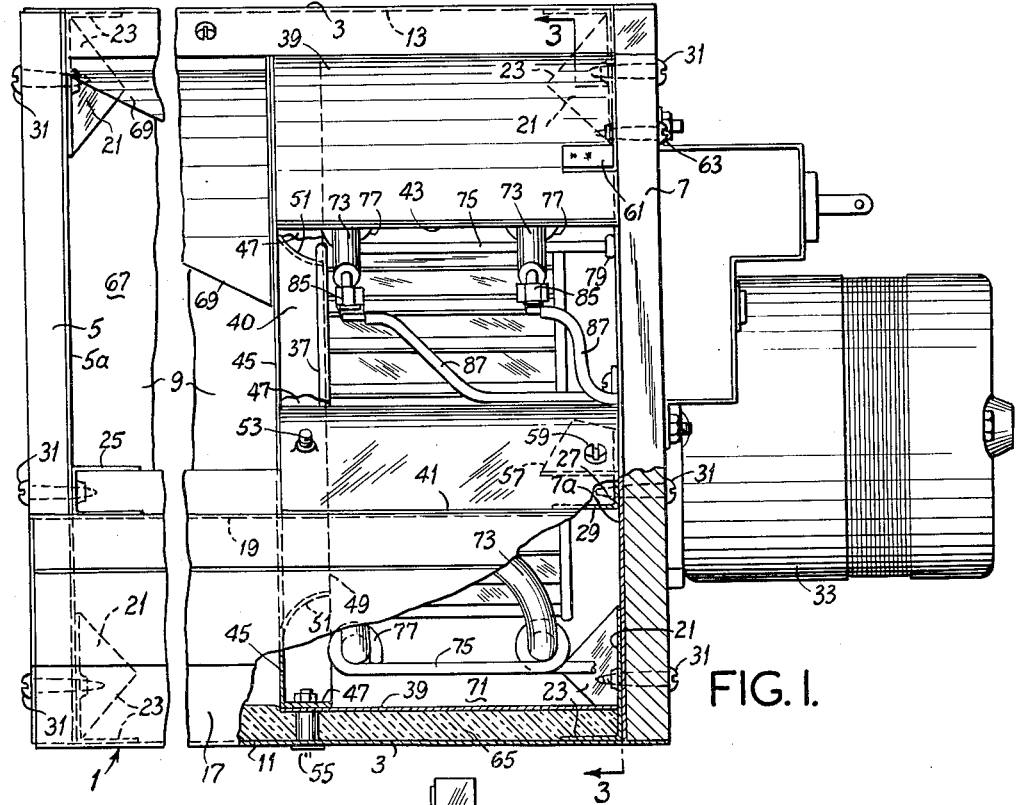
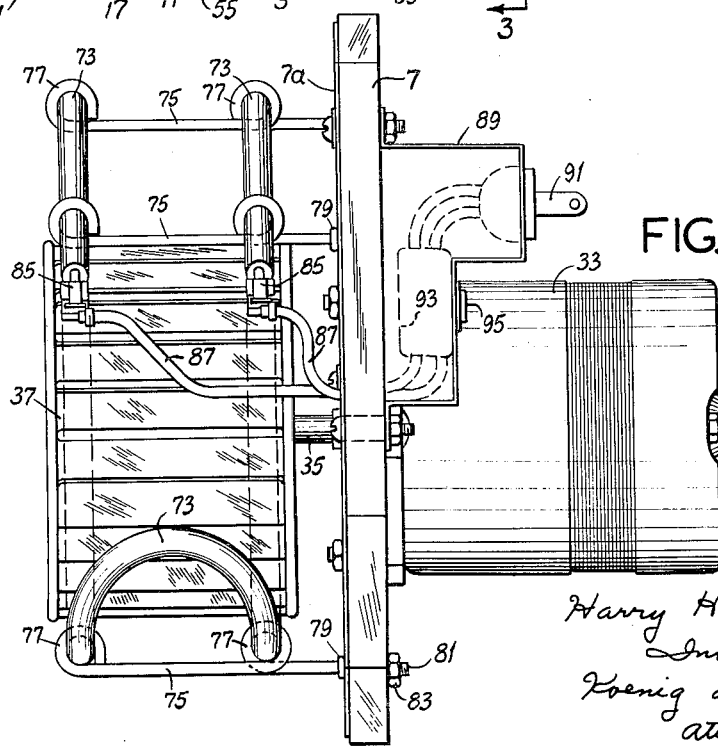

H. H. PRYOR 3,035,146

HEATING APPARATUS

Filed Jan. 28, 1960

Harry H. Pryor,
Inventor.
Koenig and Pope,
Attorneys.

United States Patent Office 3,035,146
Patented May 15, 1962

3,035,146
HEATING APPARATUS
Harry H. Pryor, St. Louis, Mo., assignor to National Vendors, Inc., St. Louis, Mo., a corporation of Missouri
Filed Jan. 28, 1960, Ser. No. 5,289
1 Claim. (Cl. 219—39)

This invention relates to heating apparatus, and more particularly to apparatus for use in a can vending machine for vending canned hot foods, the apparatus being adapted to maintain a circulation of hot air in the machine to heat cans of food stocked in the machine.

Among the several objects of the invention may be noted the provision of heating apparatus for the purpose described, though not necessarily limited to such purpose, comprising a centrifugal blower and an electrical resistance heating element for heating air delivered by the blower, wherein the arrangement is such that the air delivered by the blower is of substantially uniform temperature throughout the entire cross-sectional area of the outlet of the blower, thereby to provide for more uniform heating of cans stocked in the machine and to avoid having some cans too hot and some cans not hot enough; the provision of apparatus such as described which not only accomplishes more uniform heating of the air but also provides for better heat exchange between the heating element and the air so that the temperature of the heating element is kept down to avoid burn-out; and the provision of apparatus such as described which is constructed to facilitate servicing when necessary. Other objects and features will be in part apparent and in part pointed out hereinafter.

The invention accordingly comprises the constructions hereinafter described, the scope of the invention being indicated in the following claim.

In the accompanying drawings, in which one of various possible embodiments of the invention is illustrated, FIG. 1 is a plan view of a heating apparatus of this invention, parts being broken away between the ends of the apparatus to reduce the width of the view, other parts being broken away and shown in section;

FIG. 2 is a view of a removable subassembly of the apparatus comprising an end wall carrying the blower motor, the impeller of the blower and the heating element;

Corresponding reference characters indicate corresponding parts throughout the several views of the drawings.

Figure 3:
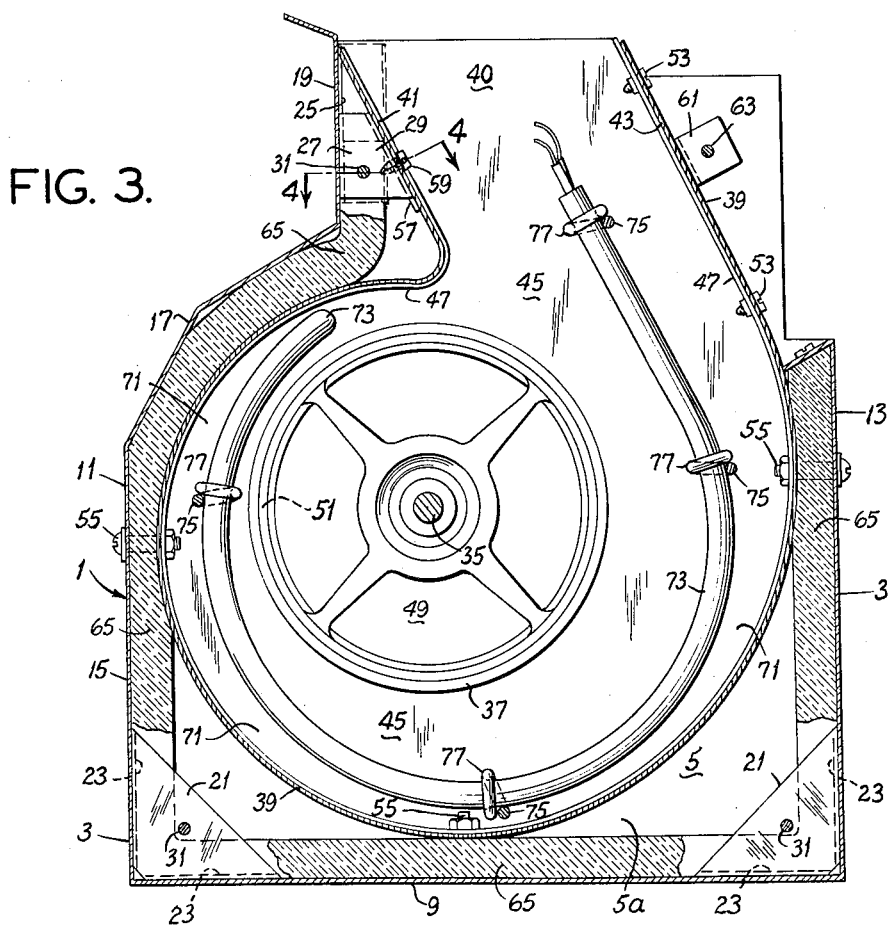
FIG. 3 is a vertical section taken on line 3—3 of FIG. 1.
Figure 4:
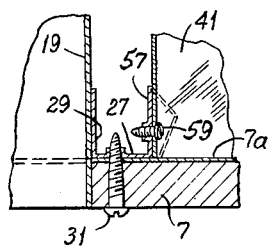
FIG. 4 is a section taken on line 4—4 of FIG. 3.

Referring to the drawings, a heating apparatus of this invention is shown to comprise a casing 1 comprising a trough-like sheet metal body 3 having end walls 5 and 7. Body 3 has a flat rectangular bottom 9, side walls 11 and 13 along the long sides thereof, and is open at the top. Side wall 13 is a vertical wall of lesser height than side wall 11. Side wall 11 has a lower vertical portion 15 of somewhat less height than side wall 13, an intermediate portion 17 extending inward from the upper end of portion 15, and an upper vertical portion 19. Each end wall 5 and 7 comprises a relatively thick plate of rigid insulating material, such as a material composed of asbestos and an inorganic binder, with inside sheet metal liner plates 5a and 7a on walls 5 and 7, respectively.

The end walls 5 and 7 have a height corresponding to the height of side wall 11 of casing body 3, and are shaped to correspond to the cross section of body 3, being inserted in the ends of body 3 and engaging triangular sheet metal gussets 21 at the bottom of body 3 inset from the ends of the body 3. Each gusset 21 has ears such as indicated at 23 spot-welded to bottom 9 and portion 15 of side wall 11 or side wall 13 of body 3, as the case may be. The left end wall 5 also engages the base of a U-shaped member 25 spot-welded to upper portion 19 of side wall 11, and the right end wall 7 also engages a wall 27 of a member 29 spot-welded to upper portion 19 of side wall 11. The end walls 5 and 7 are secured in place by means of screws 31 extending through screw holes provided in the end walls threaded into tapped holes in the gussets and members 25 and 29. End wall 7 is readily removable from body 3 by removing the screws 31 therefor.

End wall 7 carries electric motor 33 on the outside thereof. Shaft 35 of the motor extends through a hole in end wall 7 to the inside thereof and has blower impeller 37 secured to its inner end. This impeller is of conventional standard construction. Surrounding the impeller is the blower scroll 39, which consists of a band of sheet metal having a width about one-third the length of body 3 bent to form a spiral scroll with a tangential outlet 40 defined by an angled lip 41 and a tangential lip 43 on the scroll.

The right end of the scroll 39 is closed by end wall 7 when the latter is in place. An inlet plate 45 is secured within the other end of the scroll. This plate 45 has a peripheral flange 47 and an inlet opening 49 bounded by a curved flange 51 forming an inlet throat leading into the interior of the left end of the impeller 37. The left end margin of scroll 39 overlies the flange 47 and is secured thereto in part by bolts 53 and in part by bolts 55, the latter also serving to secure the scroll and plate 45 to body 3. The angled lip 41 of the scroll engages an inclined wall 57 of member 29 and is secured thereto by a screw 59. Tangential lip 43 of the scroll has an angle clip 61 spot-welded thereto at the right end of the scroll having a tapped hole receiving a screw 63 extending through a hole in end wall 7, screw 63 being removable for removal of end wall 7. Suitable insulation such as indicated at 65 is provided between the scroll and body 3.

The space within casing 1 to the left of the inlet plate 45 (i.e., the space between the left end wall 5 and the inlet plate 45) constitutes an air inlet chamber 67. An air guide 69 of suitable conformation is provided in this chamber secured to the wall 13 of body 3 for directing air entering chamber 67 to the inlet opening 49 in inlet plate 45. The impeller 37 is so located relative to the scroll that a space 71 is provided within the scroll around the impeller, this space gradually increasing in cross-sectional area from the region of the inner end of the angled lip 41 of the scroll around in counterclockwise direction as viewed in FIG. 3 to the tangential air outlet 40.

An electrical resistance heating element 73 is provided in the scroll 39 within the space 71, extending around the impeller within the scroll from adjacent the inner end of the angled lip 41 to the outlet 40. As shown, heating element 73 is constituted by a loop of tubular electrical resistance material, the loop being bent into a coil for surrounding the impeller 37. The heating element is mounted in brackets 75 secured to and extending inward from the end wall 7 of the housing. Each bracket 75, as shown, is constituted by a rod bent to provide two eyes 77 for receiving the two sides of the heater loop. The rod has a collar 79 engaging the right end wall 7 and a screw-threaded end portion 81 extending through a hole in end wall 7, a nut 83 being threaded on portion 81 against the outside of wall 7 to fasten the rod to the wall 7. Terminals 85 are provided in the ends of the heater loop, and wire connections 87 are made from these terminals through holes in wall 7 to a bracket 89 on the outside of side wall 7, which carries terminal prongs 91 and a thermostatic switch 93 having a manual reset button 95. This switch opens to deenergize the motor 33 and the heating element 73 if the ambient temperature exceeds a predetermined limit to protect merchandise in the vending machine from overheating.

The impeller 37, when in operation, causes a turbulent flow of air through space 71 from the region of the inner end of the angled lip 41 of the scroll around to the outlet 40. Heating element 73, being located in space 71 around the impeller, is in heat-exchange relationship to turbulent air in space 71. Due to the turbulence, air exiting through outlet 40 is of substantially uniform temperature throughout the cross-sectional area of the outlet, and maximum heat exchange occurs between the heating element and the air so that the temperature of the heating element may be maintained within reasonable limits while insuring adequate heating of the air. If replacement of heating element 73, or motor 33, or switch 93 should be required, for example, the subassembly of end wall 7, blower motor 33, impeller 37, heating element 73 and switch 93 is readily removable as a unit for servicing, and a new subassembly immediately put into place.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

Apparatus for heating and delivering air comprising a centrifugal blower, said blower comprising a scroll and end walls for the scroll, one end wall having an air inlet opening therein and the other being removable, an electric motor mounted on the outside of the removable end wall and having a shaft extending through a hole in the removable end wall to the inside, an impeller on the inner end of the shaft within the scroll, said scroll having an angled lip and a tangential lip defining an outlet for exit of air and being spaced outward from the impeller thereby to provide a space within the scroll around the impeller through which air may flow to the outlet, said space increasing in cross sectional area from the region of the inner end of the angled lip around to the outlet, said impeller when in operation causing a turbulent flow of air through said space to the outlet, and a spiral-shaped electrical resistance heating element carried by said removable end wall and located within said space, said heating element extending continuously around said impeller from adjacent the inner end of the angled lip to the outlet and being spaced outward from the periphery of said impeller and inward from said scroll so as to be in heat-exchange relationship to turbulent air in said space, said heating element being in the form of a loop bent into a coil extending around the impeller, and being mounted on brackets extending inward from said removable end wall.

References Cited in the file of this patent

UNITED STATES PATENTS

| | | |
|---|---|---|
| 732,349 | Hawkins | June 30, 1903 |
| 745,507 | De Mare | Dec. 1, 1903 |
| 1,050,372 | Mies | Jan. 14, 1913 |
| 1,991,280 | Hynes | Feb. 12, 1935 |